(12) United States Patent
Thiessen

(10) Patent No.: US 8,584,905 B2
(45) Date of Patent: Nov. 19, 2013

(54) HOPPER BOTTOM FOR STORAGE BIN

(76) Inventor: Lester James Thiessen, Neilburg (CA)

( * ) Notice: Subject to any disclaimer, the term of this patent is extended or adjusted under 35 U.S.C. 154(b) by 829 days.

(21) Appl. No.: 12/755,680

(22) Filed: Apr. 7, 2010

(65) Prior Publication Data

US 2011/0014020 A1    Jan. 20, 2011

Related U.S. Application Data

(60) Provisional application No. 61/226,949, filed on Jul. 20, 2009.

(51) Int. Cl.
*B65G 69/06*   (2006.01)
*B67D 7/06*    (2010.01)

(52) U.S. Cl.
USPC ............... 222/195; 52/197; 52/195; 52/192; 222/460

(58) Field of Classification Search
USPC ............ 222/412, 413, 410, 185.1, 195, 556, 222/630, 637; 414/288, 326, 310, 319; 193/2 R, 9; 52/194, 197, 245; 472/116; 198/550.1, 540, 568
See application file for complete search history.

(56) References Cited

U.S. PATENT DOCUMENTS

| | | | | |
|---|---|---|---|---|
| 1,382,897 A * | 6/1921 | Esche | ............ | 193/2 R |
| 1,654,719 A * | 1/1928 | Clapp | ............ | 193/3 |
| 1,732,400 A * | 10/1929 | Eaton | ............ | 52/192 |
| 1,789,885 A * | 1/1931 | Skinner | ............ | 193/2 R |
| 3,198,493 A * | 8/1965 | Sukup | ............ | 366/261 |
| 3,532,232 A * | 10/1970 | Sukup | ............ | 414/287 |
| 3,791,085 A * | 2/1974 | Groves | ............ | 52/197 |
| 4,026,426 A * | 5/1977 | Shivvers | ............ | 198/661 |
| 4,029,219 A * | 6/1977 | Rutten et al. | ............ | 414/308 |
| 4,294,019 A * | 10/1981 | Seitmann | ............ | 34/65 |
| 4,449,646 A * | 5/1984 | Bonerb et al. | ............ | 222/95 |
| 4,520,714 A | 6/1985 | Gullickson | | |
| 4,824,312 A * | 4/1989 | Schiltz | ............ | 414/310 |
| 5,468,122 A * | 11/1995 | Van Fossen | ............ | 414/808 |
| 5,604,994 A | 2/1997 | Annen et al. | | |
| 6,237,813 B1 | 5/2001 | Epp et al. | | |
| 6,349,859 B1 | 2/2002 | Epp et al. | | |
| 6,497,545 B1 * | 12/2002 | Simrose | ............ | 414/310 |
| 6,971,495 B2 * | 12/2005 | Hedrick et al. | ............ | 193/2 R |
| 7,413,024 B1 * | 8/2008 | Simontacchi et al. | ............ | 169/48 |
| 2005/0036860 A1 * | 2/2005 | Moen | ............ | 414/288 |

FOREIGN PATENT DOCUMENTS

CA    2008299    7/1991

* cited by examiner

*Primary Examiner* — Paul R Durand
*Assistant Examiner* — Jeremy W Carroll
(74) *Attorney, Agent, or Firm* — Ryan W. Dupuis; Kyle R. Satterthwaite; Ade & Company Inc

(57) ABSTRACT

A hopper bottom for a cylindrical grain bin includes a floor structure, an outer cylindrical wall extending up from the floor and upon which the bin is supported, and an inner wall having an inverted cone shape which tapers downwardly and inwardly to join the floor structure about a central area. A pair of spaced apart upright auger chute walls extend radially outward from the central area to an access opening in the outer wall to receive an auger for unloading. Screens are flush mounted in the inner wall such that ventilation air directed into a manifold space between the inner and outer walls is forced up through the screens into the grain bin. The floor structure includes a floor sheet, a perimeter member about the outer wall, and radial supports extending between the central area and the perimeter members.

20 Claims, 4 Drawing Sheets

US 8,584,905 B2

HOPPER BOTTOM FOR STORAGE BIN

This claims the benefit under 35 U.S.C. 119(e) of U.S. provisional application Ser. No. 61/226,949, filed Jul. 20, 2009.

FIELD OF THE INVENTION

The present invention relates to a hopper bottom for supporting a storage bin thereon, for example a grain storage bin having a cylindrical side wall, and more particularly the present invention relates to a hopper bottom comprising an inner wall having an inverted cone shape which tapers downwardly and inwardly from a surrounding cylindrical outer wall support to a floor structure spanning below the outer wall support.

BACKGROUND

Particulate material storage bins are commonly used on farms for storing the grain. In some instances the grain bins include a flat bottom from which the cylindrical wall of the bin extends upwardly. In this instance an additional mechanism to assist in unloading the auger is desirable as disclosed in U.S. Pat. Nos. 6,349,859 and 6,237,813 both by Epp et al.

In other instances it is desirable for the grain bin to comprise a hopper bottom which is generally conical so as to taper downwardly and inwardly to the center to assist in center unloading of the grain bin. Such hopper bottoms may be formed integrally with the grain bin or may be for as a separate component upon which a commercially available cylindrical bin is then supported. Canadian patent application 2,008,299 by Weninger discloses an example of a grain bin hopper bottom in which the tapering cone portion terminates at a central bottom end spaced above the ground to receive an auger inlet therebelow. In this instance the grain commonly spills onto the ground about the auger requiring considerable effort to clean up. In some instances a separate boot is mounted about the inlet end of the auger in the form of a collection hopper which directs material exiting the cone of the grain bin hopper bottom to the inlet of the auger. Use of a separate hopper boot attached to the auger can be cumbersome and awkward to manipulate.

Another known hopper bottom, previously made commercially available by Westeel under the trademark name the "Boot", comprises a conical hopper portion which is surrounded by a cylindrical outer wall which supports the cone and the cylindrical bin walls thereabove. The bottom end of the cone portion includes an integral upper boot structure suspended above the floor of the hopper bottom with minimal access provided only by an auger opening spaced above the floor so that the boot is difficult to clean out. Ventilation of the grain in this hopper bottom is made available by a plurality of perforated channels protruding into the cone portion of the hopper bottom. Similar to many prior designs however the perforated channels project upwardly and inwardly beyond the inner surface of the cone portion of the hopper bottom so as to impede grain flow along the surface of the hopper towards the central discharge through the boot. Accordingly the grain bin is very difficult to clean out as considerable grain can be trapped on the various protruding surfaces of the ventilation system. Furthermore the cup shaped enclosed lowest point of the boot further prevents adequate cleanout of the grain bin when desired.

Further examples of grain drying through a hopper cone are disclosed in U.S. Pat. No. 5,604,994 by Annen et al. and U.S. Pat. No. 4,520,714 by Gullickson. In each instance a portion of the ventilation system protrudes inwardly into the interior of the hopper cone so as to impede the flow of material downwardly to the central discharge thereof, thus preventing adequate cleanout after the bin has been emptied.

SUMMARY OF THE INVENTION

According to one aspect of the invention there is provided a hopper bottom for supporting a cylindrical side wall of a grain bin thereon, the hopper bottom comprising:

a floor structure spanning radially outwardly from a central area to a surrounding perimeter area;

an outer wall support extending upwardly from the perimeter area of the floor structure about the central area of the floor structure to a top end spaced upwardly from the floor structure and arranged to support the cylindrical side wall of the grain bin thereabove;

an inner wall having an inverted cone shape so as to taper downwardly and inwardly from a top end to a bottom end of the inner wall, the top end of the inner wall being joined with the outer wall support at a location spaced above the floor structure about a full circumference of the outer wall support, and the bottom end of the inner wall being joined with the floor structure about the central area of the floor structure;

an auger opening formed in one side of the inner wall to extend upwardly from the central area in a radial direction towards an upper edge which is nearer to the bottom end of the inner wall than the top end of the inner wall;

a pair of auger chute walls spanning between the floor structure and the inner wall on opposing sides of the auger opening to extend in the radial direction from the central area towards the cylindrical outer wall support beyond the upper edge of the auger opening, the auger chute walls being spaced apart from one another so as to define a chute between the chute walls which is arranged to receive an agricultural auger therein;

an access opening in the outer wall support in alignment with the chute between the chute walls and arranged to receive the agricultural auger therethrough.

By providing auger chute walls which span downwardly from the inner wall fully to the floor structure, the auger opening from which material is discharged from the interior of the bin is much more accessible than prior art hopper bottoms while maintaining the discharge of material from the hopper within a relatively small chute area for efficiency in unloading to the inlet end of an auger. Extending the chute between the chute walls down to the floor structure extending radially out from the auger opening ensures that there are no cupped surfaces within which material can become trapped so that the grain bin can be adequately cleaned out after use.

While the chute is sufficient by itself for gathering grain at the central area about the inlet of a transfer auger due to the close positioning of the chute walls on either side of an auger received therebetween, the gathering of the grain can be made more efficient by also mounting a slide member in the chute which redirects material falling into the chute back towards the central area. To accomplish this, the slide member comprises a sloped panel extending downwardly and inwardly from the outer end of the chute walls to the central area at an elevation which is spaced below the inner wall of the hopper bottom to receive the transfer auger therebetween.

Preferably there is provided a slide member arranged to be supported between the chute walls so as to be slidably removable from the chute in the radial direction in which the slide member extends upwardly and outwardly from the central portion of the floor structure spaced below the auger opening in the inner wall towards the outer wall support.

The slide member is preferably substantially parallel the inner wall above the slide member.

The slide member preferably comprises a generally U-shaped trough portion extending upwardly and outwardly from an inner end to an outer end of the slide member.

Preferably a pan member is arranged to span the bottom end of the inner wall so as to be slidably removable from the chute in the radial direction.

Preferably an upright wall portion extends partway about the central area of the floor structure which spans between the bottom end of the inner wall and the floor structure spaced below the bottom end of the inner wall. In this instance, the pan member may include a central portion arranged to be supported on the floor structure and a side wall extending at an upward and outward inclination from the central portion to the bottom end of the inner wall spaced above the floor structure by the upright wall portion.

The pan member is preferably integrally formed with a slide member arranged to be supported between the chute walls so as to be slidably removable from the chute in the radial direction together with the pan member in which the slide member extends upwardly and outwardly from the central portion of the floor structure spaced below the auger opening in the inner wall towards the outer wall support.

The floor structure preferably comprises a floor surface between the chute walls which spans substantially horizontally from the central portion towards the outer wall support.

Preferably an access opening in the inner wall is in communication with the chute between the chute walls at a location spaced radially outwardly and upwardly from the auger opening. A top edge of the access opening may be generally V-shape so as to extend upwardly and inwardly from opposing sides of the access opening towards a central apex. The inner wall may also comprise a protruding portion between the auger opening and the access opening in which the inner wall protrudes upwardly and inwardly from the chute walls towards a central apex between the chute walls such that a top edge of the auger opening is generally V-shape so as to extend upwardly and inwardly from opposing sides of the auger opening towards the central apex.

Preferably the chute walls are parallel to one another.

Preferably the chute walls extend only partway from the central portion towards the outer wall support to respective upright outer edges in which the upright outer edges each comprise a flange extending along a length thereof which is oriented transversely to the chute wall.

The hopper bottom preferably further comprises:
a plurality of ventilation openings formed in the inner wall;
a screen member spanning each of the ventilation openings in which the screen member is substantially flush with an upper surface of the inner wall; and
an inlet opening in the outer wall support arranged for communication with a blower;
the outer wall support comprising a continuous cylindrical wall being joined to the floor structure about a full circumference of the floor structure so as to define an enclosed manifold space surrounding the inner wall such that ventilation air forced into the enclosed manifold space is arranged to be directed upwardly through the ventilation openings in the inner wall.

When the ventilation openings are elongate in a longitudinal direction, preferably there is provided an upright support flange fixed below each of two opposed edges extending in the longitudinal direction of each ventilation opening.

When the outer wall support comprises a continuous cylindrical wall being joined to the floor structure about a full circumference of the floor structure, the floor structure may further comprise:
a floor sheet spanning from the central area to a bottom side of the outer wall support;
a perimeter member mounted about the outer wall support at the bottom side thereof; and
a plurality of radial supports, each spanning along an upper surface of the floor sheet from the central area to the outer wall support at the perimeter member;
wherein each radial support comprises a horizontal portion joined to the upper surface of the floor sheet and an upright portion extending up from the horizontal wall portion along a full length of the radial support between the central area and the outer wall support.

Preferably the floor sheet protrudes radially outward beyond the outer wall support beneath the perimeter member which is joined to the floor sheet about a circumference of the floor sheet.

Preferably a perimeter flange is provided about the access opening in the outer wall in which the perimeter flange along each side of the access opening extends outwardly from the outer wall at an inclination which is sloped away from the opposing side of the opening.

According to a second aspect of the present invention there is provided a hopper bottom for supporting a cylindrical side wall of a grain bin thereon, the hopper bottom comprising:
a floor structure spanning radially outwardly from a central area to a surrounding perimeter area;
an outer wall support extending upwardly from the perimeter area of the floor structure about the central area of the floor structure to a top end spaced upwardly from the floor structure and arranged to support the cylindrical side wall of the grain bin thereabove;
an inner wall having an inverted cone shape so as to taper downwardly and inwardly from a top end to a bottom end of the inner wall, the top end of the inner wall being joined with the outer wall support at a location spaced above the floor structure about a full circumference of the outer wall support, and the bottom end of the inner wall supported on the floor structure about the central area of the floor structure;
a plurality of ventilation openings formed in the inner wall;
a screen member spanning each of the ventilation openings in which the screen member is substantially flush with an upper surface of the inner wall; and
an inlet opening in the outer wall support arranged for communication with a blower;
the outer wall support comprising a continuous cylindrical wall being joined to the floor structure about a full circumference of the floor structure so as to define an enclosed manifold space surrounding the inner wall such that ventilation air forced into the enclosed manifold space is arranged to be directed upwardly through the ventilation openings in the inner wall.

Providing perforated screen members spanning each of the ventilation openings which are substantially flush with the surface of the inner wall which is cone shaped ensures that the ventilation system does not impede the flow of material along the upper surface of the inner wall towards the central discharge to simplify the cleanout of the bin after use. To minimize the complexity of supply tubing required to communicate with all of the ventilation openings, the present invention further provides a common manifold space between inner and outer walls of the hopper bottom which communicate with all of the ventilation openings in an efficient manner which evenly distributes ventilation air upwardly through the ventilation openings.

According to a further aspect of the present invention there is provided a hopper bottom for supporting a cylindrical side wall of a grain bin thereon, the hopper bottom comprising:

a floor structure spanning radially outwardly from a central area to a surrounding perimeter area;

an outer wall support extending upwardly from the perimeter area of the floor structure about the central area of the floor structure to a top end spaced upwardly from the floor structure and arranged to support the cylindrical side wall of the grain bin thereabove; and an inner wall having an inverted cone shape so as to taper downwardly and inwardly from a top end to a bottom end of the inner wall, the top end of the inner wall being joined with the outer wall support at a location spaced above the floor structure about a full circumference of the outer wall support, and the bottom end of the inner wall being supported on the floor structure about the central area of the floor structure;

the outer wall support comprising a continuous cylindrical wall being joined to the floor structure about a full circumference of the floor structure;

the floor structure comprising:
a floor sheet spanning from the central area to a bottom side of the outer wall support;
a perimeter member mounted about the outer wall support at the bottom side thereof; and
a plurality of radial supports, each spanning along an upper surface of the floor sheet from the central area to the outer wall support at the perimeter member;
each radial support comprising a horizontal portion joined to the upper surface of the floor sheet and an upright portion extending up from the horizontal wall portion along a full length of the radial support between the central area and the outer wall support.

The hopper bottom according to the present invention includes an inner wall which is optimally supported by the floor structure by providing a perimeter member which surrounds the bottom of the outer cylindrical wall and which is reinforced by radial supports each spanning from the central area to the outer wall at the location of the perimeter member. The location of the perimeter member at the junction of the floor sheet and the outer wall provides a maximum strength with a minimum use of materials to provide a desirable chute structure and a common manifold space in a hopper bottom in a manner which is unseen in the prior art.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
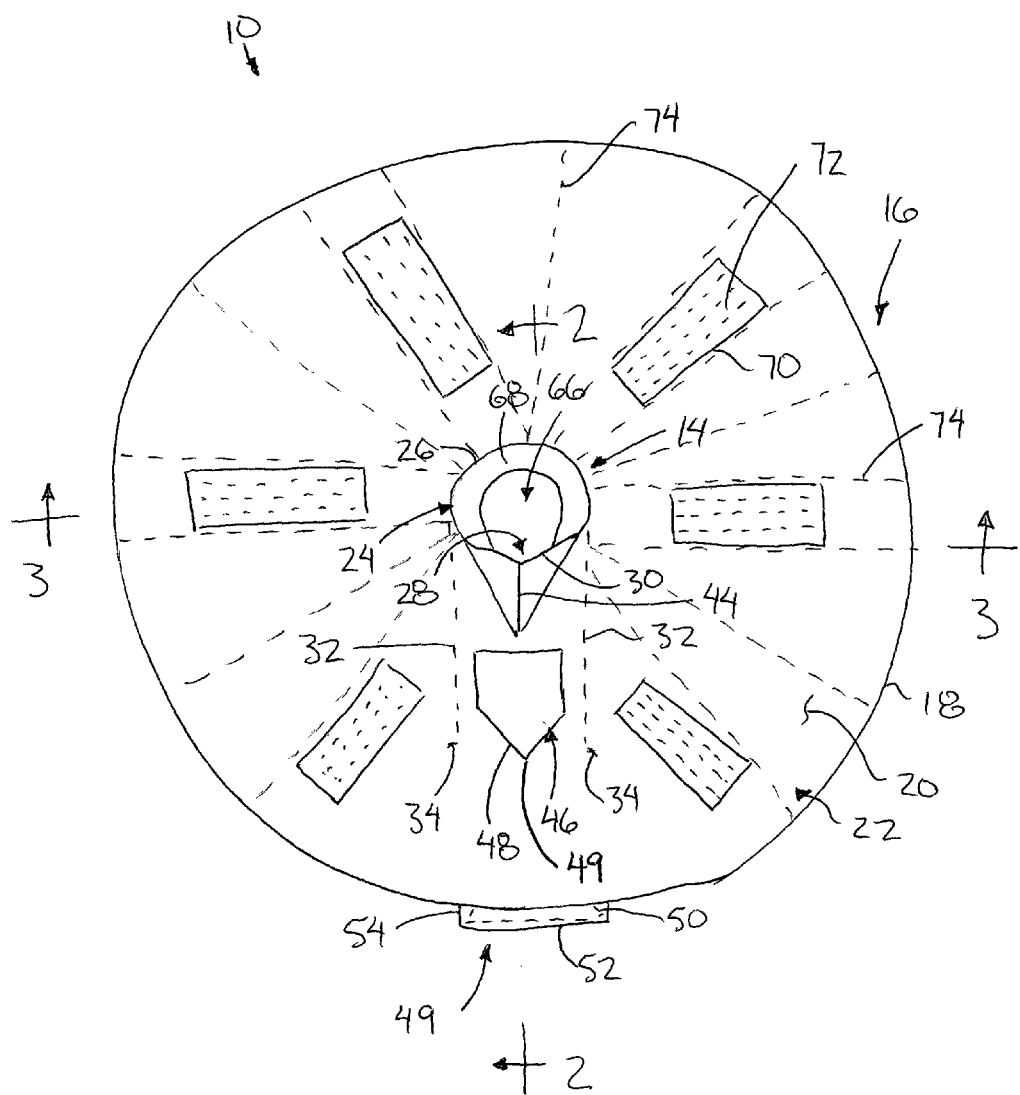
FIG. 1 is a top plan view of the hopper bottom.
Figure 2:
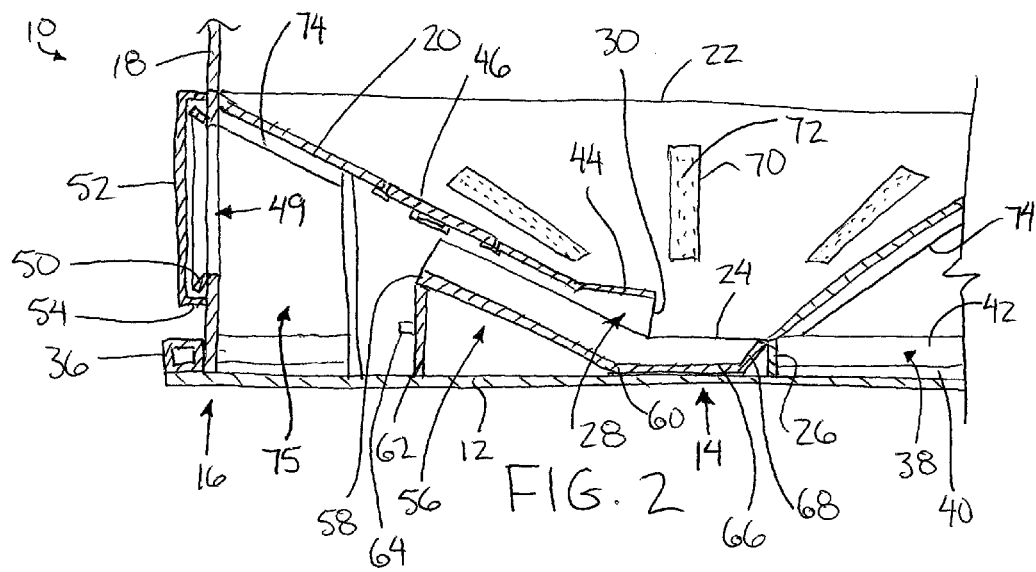
FIG. 2 is a sectional view along the line 2-2 of FIG. 1.
Figure 3:
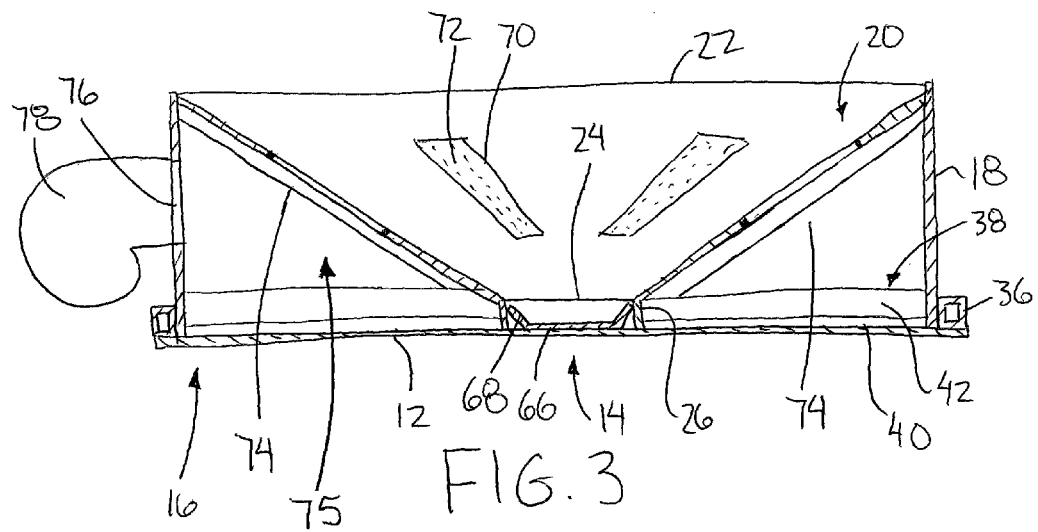
FIG. 3 is a sectional view along the line 3-3 of FIG. 1.
Figure 4:
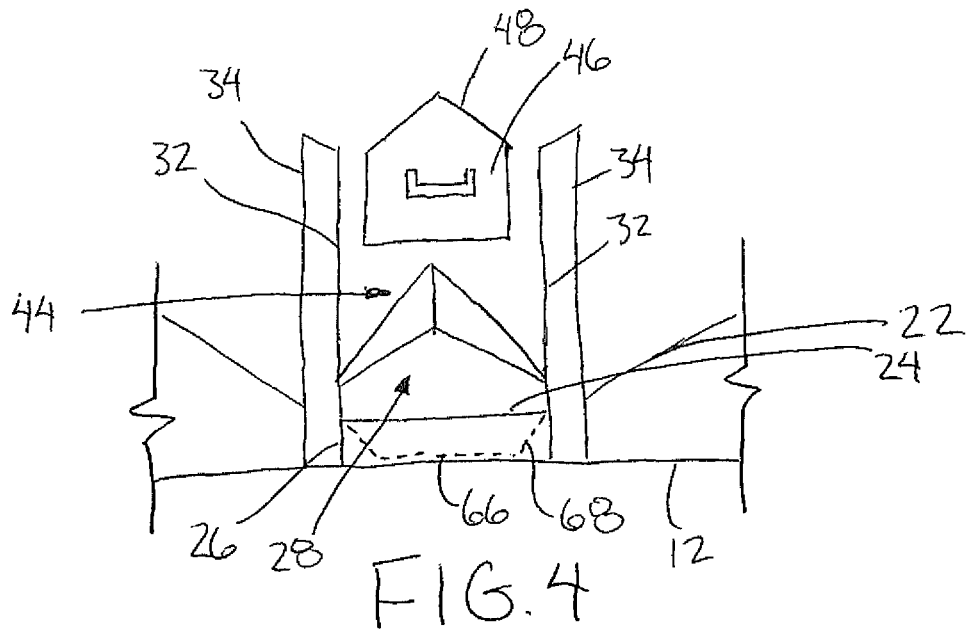
FIG. 4 is an end elevational view of the chute between the chute walls with the slide member shown removed.
Figure 5:
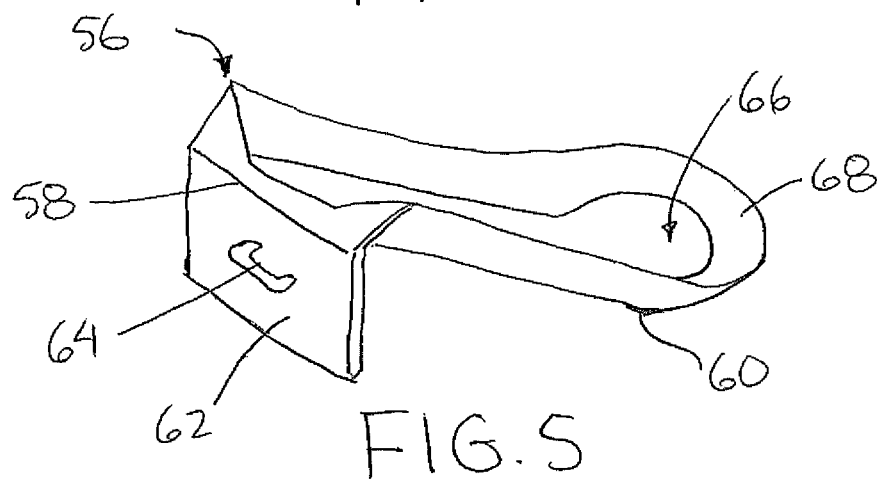
FIG. 5 is a perspective view of the slide member.
Figure 6:
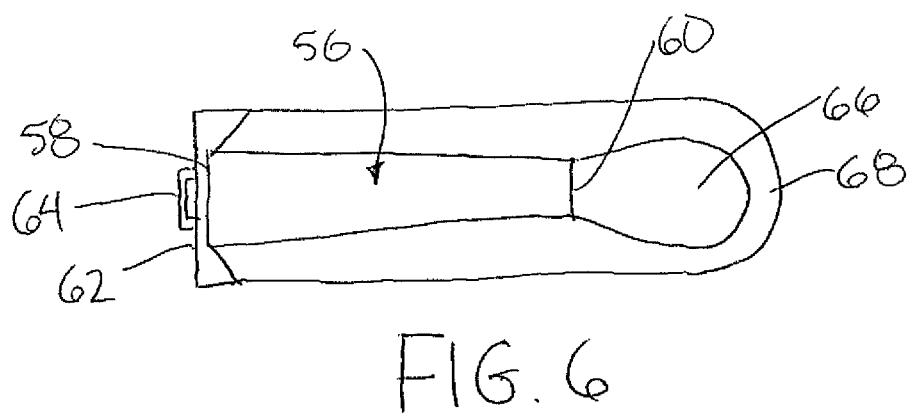
FIG. 6 is a top plan view of the slide member.
Figure 7:
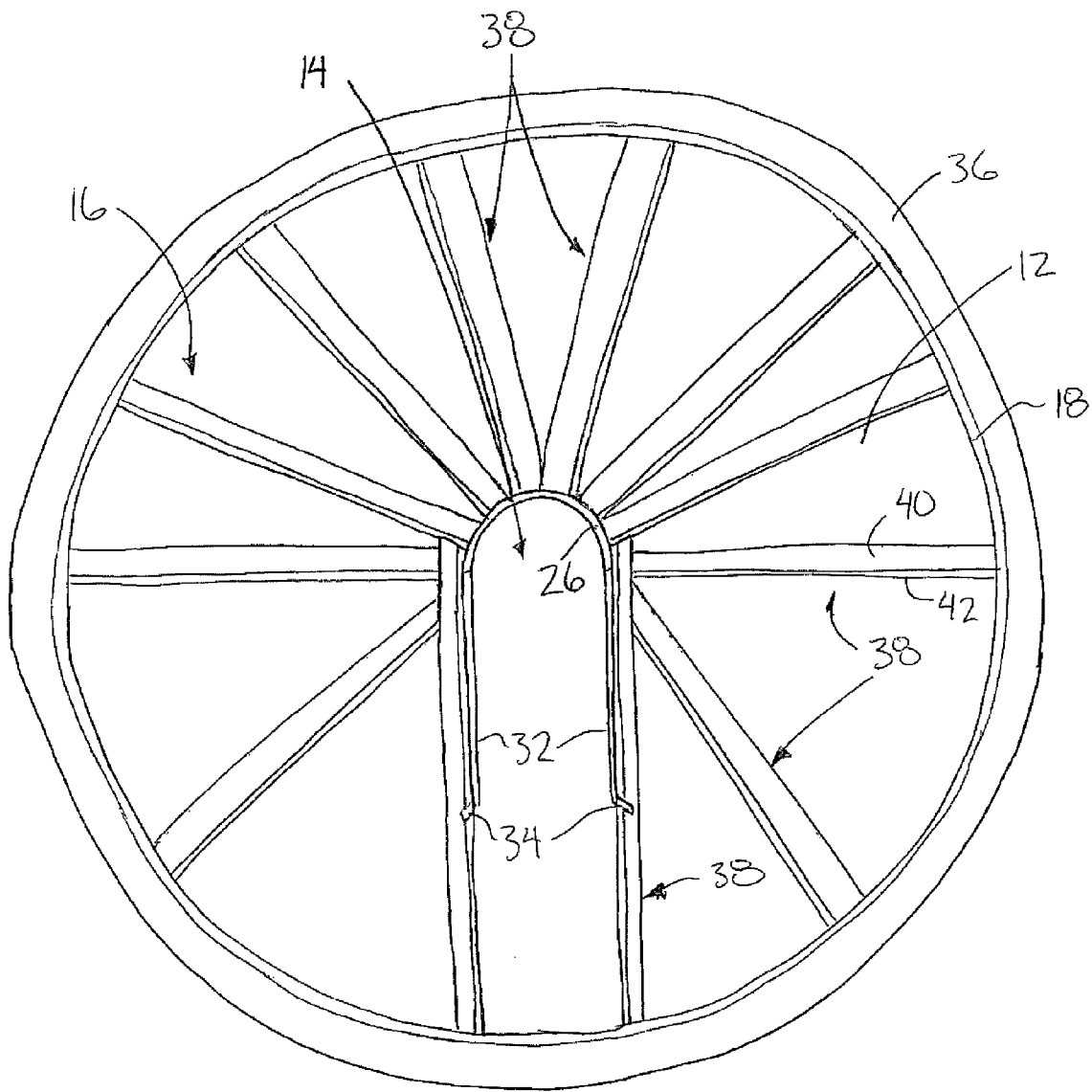
FIG. 7 is a top plan view of the floor structure.
Figure 8:
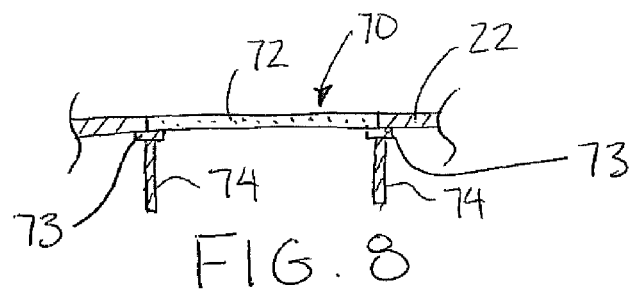
FIG. 8 is a sectional view along the line 8-8 of FIG. 3 illustrating one of the perforated screen members within a respective ventilation opening in the inner wall.

Referring to the accompanying figures there is illustrated a storage bin hopper bottom generally indicated by reference numeral 10. The hopper bottom 10 is particularly suited for a storage bin of the type commonly used for storing grain in agricultural applications in which the grain bin comprises a cylindrical side wall extending upwardly to an enclosed top having suitable access therein for filling the grain bin. The upper bottom 10 can be formed integrally with the grain bin, or can be supplied separately for mounting a commercially available cylindrical grain bin thereon after delivery to the customer.

The hopper bottom 10 comprises a floor structure having a generally horizontal floor sheet 12 which spans horizontally along the ground or a suitable foundation in a radial direction outwardly from a central area 14 to a perimeter area 16 surrounding the central area about the outer edge of the floor sheet.

The hopper bottom 10 further comprises an outer wall support 18 comprising a continuous cylindrical outer wall extending upwardly from the perimeter area of the floor structure so as to be joined to the floor structure about the full circumference of the floor sheet 12. The outer wall support 18 extends vertically upward from the floor structure to a top end which is generally circular and which lies in a substantially horizontal plane so as to be arranged to support the cylindrical side wall of the grain bin thereon to extend continuously upward from the wall forming the outer walls support 18.

The hopper bottom 10 further comprises an inner wall 20 having the shape of an inverted cone which tapers downwardly and inwardly from a circular top end 20 to a circular bottom end 24 of smaller diameter. The top end is joined with the top end of the outer wall support 18 about the full circumference thereof. The bottom end 24 is joined to the floor sheet 12 by an upright wall portion 26 such that the bottom end surrounds the central area 14 of the floor structure. The upright wall portion 26 is generally semicircular in shape and vertical in orientation having a height which is much less than the diameter of the central area surrounded by the bottom end of the inner wall in the order of a few inches so as to span vertically between the bottom end of the inner wall 20 and the floor sheet 12 therebelow about a proton of the circumference of the bottom end of the inner wall.

An auger opening 28 is provided in the inner wall 20 in communication with the central area to extend to one side of the inner wall in a radial direction from the central area towards an upper edge 30 defining the top end of the auger opening at a location spaced upwardly and outwardly from the central area. The auger opening 28 is aligned with the gap in the upright wall portion 26 about the central area such that the auger opening is fully open through to the floor sheet 12 of the floor structure at the central area. The auger opening has a height which is near to a diameter of the central area surrounded by the bottom end of the inner wall 20 such that the upper edge 30 defining the top end of the auger opening is nearer to the bottom end of the inner wall than the top end thereof. The auger opening 28 is suitably sized for receiving the inlet end of an agricultural grain auger therein for unloading the grain from the hopper bottom.

Two chute walls 32 are mounted in a vertical orientation parallel and spaced apart from one another at opposing sides of the auger opening to span a full height between the inner wall and the floor sheet of the floor structure. The two chute walls 32 extend in the same radial direction that the auger opening 28 is offset from the central area with chute walls being spaced apart by approximately the lateral dimension of the auger opening to full receive the auger opening between the chute walls 32. The chute walls extend in the radial direction from the central area partway towards the outer wall to respective outer edges which are vertical in orientation and join the inner wall a top end thereof at a location spaced upwardly and outwardly beyond the auger opening. The chute walls 32 thus define an auger chute 36 therebetween which is arranged to receive the auger tube of the agricultural auger communicating with the central area of the hopper bottom. The outer edges 34 of the chute walls are bent to define respective flanges extending the full height thereof which are transverse to the chute walls to extend outwardly away from the opposing wall in each instance.

The floor structure further comprises a perimeter member 36 in the form of a rigid tubular member which overlaps overtop of the perimeter of the floor sheet 12 about the outer surface of the outer wall support 18 in fixed connection therewith. The floor sheet thus extends radially outward beyond the outer wall support 18 to support the perimeter member thereon in which the perimeter member is joined to both the floor sheet and outer side of the upright outer wall about the full circumference of the floor structure for added strength at the connection between the upright outer wall and the floor structure. A plurality of radial supports 38 are also provided within the interior of the hopper bottom to span the top side of the floor sheet, each in a radial direction from the upright wall portion 26 or the chute walls 32 to an inner surface of the outer wall 18 directly opposite the exterior perimeter member 36. Each radial support 38 comprises a rigid angle having a horizontal portion 40 fixed horizontally alongside the upper surface of the floor sheet 12 and a vertical portion 42 extending upwardly therefrom to provide added stiffness to the floor.

Two of the radial supports 38 of the floor structure extend along respective outer sides of the chute walls which are opposite one another such that the two radial supports span parallel to one another spaced apart on opposing sides of the chute defined between the chute walls. In this manner the floor sheet 12 of the floor structure is continuous and uninterrupted to define a flat horizontal surface extending continuously and radially outward from the central area to the perimeter area at the chute location for ease of cleanout of the central area after the auger has been removed.

To increase the strength of the inner wall 20 directly above the auger opening, the upper edge 30 of the auger opening is generally V-shaped extending upwardly and inwardly from the two chute walls to a central apex centered between the chute walls. The inner wall directly above the upper edge 30 thus defines a protruding portion comprised of two triangular shaped panels extending upwardly and inwardly towards a common apex aligned with the apex of the upper edge 30 of the opening. The protruding portion 44 of the inner wall has an upper end which is located partway along the chute walls so that an access opening 46 can be provided above the protruding portion.

The access opening 46 in the inner wall is located between the chute walls within the chute area above the protruding portion 44 of the inner wall. The access opening comprises a suitably sized manhole opening to permit inspection of the interior of the hopper bottom when empty. Under normal operation of the grain bin, a suitable panel member spans the opening in which the panel is substantially flush with the inner surface of the inner wall to prevent collection of material thereon. The access opening is substantially rectangular with the exception of the top edge 48 thereof which extends upwardly and inwardly from two opposed sides of the access opening to a central apex 49 similar to the upper edge 30 of the auger openings. The panel is similarly shaped such that the top edge thereof tapers downwardly and outwardly from a central apex to prevent the flow of granular materials being caught of the access opening or panel received therein.

For access of the auger through the outer wall to the chute, a suitable door opening 49 is provided in the outer wall in alignment with the radial direction of the chute. The door opening 49 includes a top end spaced above the height of the chute walls so as to receive an auger tube therethrough when the auger tube extends at an upward and outward incline from an inlet end at the central area of the hopper bottom.

The door opening 49 includes a perimeter flange 50 which extends about the full perimeter of the door opening including the top side, the bottom side, and the two opposed upright sides of the opening. In each instance the flange projects generally radially outward from the outer wall at an inclination which is sloped away from the opposing side of the door opening. In this instance the perimeter flange diverges outwardly with increasing cross-sectional dimension between opposed flanges from the door opening 49 in the outer wall outward to the free end of the flange.

A suitable door panel 52 is provided to fully span the outer side of the door opening including the perimeter flange 50. The door panel 50 further comprises an overlapping flange 54 about the full perimeter thereof to span the gap between the door panel 52 and the outer wall locating the door opening therein externally outward relative to the perimeter flange 50 on all side of the openings. In this instance, any rain or outside elements can only be received between the door panel 52 and the outer wall directly alongside the outer wall such that the outward angle of the perimeter flange 50 redirects the elements outwardly to the opposing sides from the top side to be deflected downwardly away from the door opening at the outer wall due to the trough shape of the upper portion of the perimeter flange which prevents access to the door opening.

To assist in gathering of grain to the central area at the location of the auger opening and the chute therebelow, a slide member 56 is provided which is removably supported within the chute between the chute walls. While the chute is sufficient by itself without the slide member for gathering grain at the central area about the inlet of an auger due to the close positioning of the chute walls on either side of an auger received therebetween, the gathering of the grain can be made more efficient by mounting the slide member 56 in the chute so as to also redirect material falling into the chute back towards the central area.

The slide member 56 accomplishes this by comprising a sloped panel extending downwardly and inwardly from an outer end 58 at the outer end of the chute walls to an inner end 60 adjacent the central area. The panel comprises a trough shaped member having a base extending along the centre of the panel from the inner end to the outer end and a pair of side walls sloping upwardly and outwardly from the base at the central portion so as to be generally U-shaped about the bottom side of the auger tube received in the chute.

The trough portion defined by the panel of the slide member 56 extends downwardly and inwardly within the chute with a slope which is similar and substantially parallel to the inclination of the inner wall of the hopper bottom spaced thereabove by a vertical distance corresponding at least to the diameter of the agricultural auger arranged to be received therebetween in use. The trough portion of the slide member formed by the panel spanning from the inner end to the outer end has a width between opposing elongate edges including the base and the side walls connected thereto which is substantially equal to the space between the chute walls to contain any material to be discharged from the hopper bottom between the chute walls at a location which is above and inward of the slide member when the slide member is positioned within the chute.

The panel of the slide member is supported at the outer end thereof by an end wall 62 which extends generally vertically downward from the outer end at a location which is spaced radially outward from the auger opening thereabove. A suitable handle 64 is mounted at the exterior of the end wall 62 assist a user in manually removing the slide member by sliding movement in the radial direction of the chute. The inner end of the trough portion and the end wall 62 at the outer end are supported directly on the top side of the floor sheet of the floor structure.

A pan member 66 is also provided to fully span the central portion of the floor structure which is also readily removable to assist in cleaning out the hopper bottom when desired. The pan member 66 comprises a flat base which is elongate in the radial direction of the chute from the central area and which is arranged to sit flat on the floor at the central area. The pan member further comprises a side wall 68 extending upwardly about a portion of the circumference of the central portion of the pan member to extend at an inclination which is upward and radially outward from a location on the central portion spaced radially inward from the upright wall portion 26 to a top end of the side wall which is abutted with the wall portion 26 at the intersection thereof with the bottom end of the inner wall 20 such that the side wall 68 forms a continuous sloped surface with the inner surface of the inner wall 20 from the bottom end thereof to the central portion of the pan member supported on the floor structure at the central area spaced therebelow.

In the illustrated embodiment the pan member 66 and the slide member 56 are integral with one another such that the base of the trough portion of the slide member extends downward for connection directly to the flat central portion of the pan member while the side walls of the trough portion which are sloped upwardly and outwardly from the base of the trough portion are joined integrally with the opposing ends of the semicircular side wall 68 of the pan member. The pan member and the slide member are slidably removable together from the chute in the radial direction of the chute from the central area towards the access opening in the outer wall.

All material discharged from the bottom end of the inner wall 20 of the hopper bottom including through the auger opening 28 therein is deposited onto one of the slide member 56 or the pan member such that the sloped side walls thereof direct the particulate material downwardly and centrally to a central portion of the pan member. After discharge of material from the hopper bottom is substantially complete sliding removal of the pan member and slide member together in the radial direction from the chute ensures that all remaining material in the hopper bottom is also removed as all of the remaining material is directed downwardly and inwardly to the central portion of the pan member. The width of the pan member and the slide member are substantially identical with one another and the dimensions of the chute and central area of the floor structure with which the chute communicates so that the flat floor of the central area and chute are fully covered by the slide member 56 and pan member when mounted in position within the chute while the pan member and slide member remain readily removable for additional cleanout as may be desired.

To provide ventilation to the contents of the hopper bottom and grain bin thereabove, a plurality of ventilation openings 70 are provided in the inner wall of the hopper bottom. Each of the ventilations openings is elongate in a radial direction extending upwardly and outwardly. Each of the ventilation openings 70 supports a screen member comprising a perforated or mesh material in which the screen member 72 is supported to span the opening so as to be substantially flush with the inner surface of the inner wall of the hopper bottom. The screen members 72 are thus supported relative to the inner wall by suitable supports 73 located at the underside of the inner wall such that the screen members do not protrude into the interior space above the inner wall of the hopper bottom.

The screen members can be perforated to define a plurality of slots formed therein. In alternative embodiments, the screen members may comprise round hole grating instead of slotted grating material.

The underside of the inner wall 22 also supports a plurality of vertical flanges 74 thereon which depend downwardly from the inner wall, perpendicularly thereto for increasing the strength of the inner wall. Each of the flanges 74 spans a full radial distance of the inner wall from the wall portion 26 about the central area to the outer wall about the outer periphery of the inner wall. The flanges are each oriented in a respective radial direction at evenly circumferentially spaced positions about the central area. Typically each of the ventilation openings includes two of the flanges 74 associated therewith such that the flanges 74 extend along opposing elongate side edges of the opening for providing additional stiffening of the inner wall of the hopper bottom at the ventilation openings in particular.

In further embodiments, to provide further strength to the hopper bottom, each of the radial supports 38 may comprise a tubular member of square cross-section. In this instance, each radial support 38 comprises two vertical flanges defining two parallel and spaced apart vertical portions 42 joined between a top flange and a bottom flange. The top and bottom flanges thus also define two horizontal portions 40 for each radial support 38. The vertical portions 42 of the radial supports 38 and the vertical flanges 74 on the underside of the inner wall, together with the floor sheet, the outer wall, and the inner wall form a rigid structure which can readily support very large cylindrical grain bins thereon.

Furthermore, the floor sheet, the inner wall, and the outer wall are all joined to one another about the full circumference of the hopper bottom to define an enclosed manifold space 75 between the inner and outer walls which surrounds the inner wall locating all of the ventilation openings therein. The manifold space thus commonly communicates with all of the ventilation openings to provide an even supply of ventilation air upwardly through the ventilation openings for drying and ventilating grain supported in the grain bin thereabove. A suitable inlet opening 76 is provided in the outer wall to which a blower or fan 78 is mounted in communication to force air into the manifold space. The enclosed nature of the manifold space about the inner wall ensures that any air forced into the enclosed space is directed upwardly through the ventilation openings without any components of the ventilation system protruding upwardly and inwardly into the storage space of the hopper bottom and hopper thereabove and without the need for any complex passages or tubing communicating between the relatively large surface areas of the various ventilation openings in the inner wall.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A hopper bottom for supporting a cylindrical side wall of a grain bin thereon, the hopper bottom comprising:

a floor structure spanning radially outwardly from a central area to a surrounding perimeter area;

an outer wall support extending upwardly from the perimeter area of the floor structure about the central area of the floor structure to a top end spaced upwardly from the floor structure and arranged to support the cylindrical side wall of the grain bin thereabove;

an inclined inner wall having an inverted cone shape so as to taper downwardly and inwardly from a top end to a bottom end of the inclined inner wall, the top end of the inclined inner wall being joined with the outer wall support at a location spaced above the floor structure about a full circumference of the outer wall support, and the bottom end of the inclined inner wall being joined with the floor structure about the central area of the floor structure;

an auger opening formed in one side of the inclined inner wall to extend upwardly from the central area in a radial direction towards an upper edge which is nearer to the bottom end of the inclined inner wall than the top end of the inclined inner wall;

a pair of auger chute walls spanning between the floor structure and the inclined inner wall on opposing sides of the auger opening to extend in the radial direction from the central area towards the cylindrical outer wall support beyond the upper edge of the auger opening, the auger chute walls being spaced apart from one another so as to define a chute between the chute walls which is arranged to receive an agricultural auger therein;

an access opening in the outer wall support in alignment with the chute between the chute walls and arranged to receive the agricultural auger therethrough.

2. The hopper bottom according to claim 1 wherein there is provided a slide member arranged to be supported between the chute walls so as to be slidably removable from the chute in the radial direction, the slide member extending upwardly and outwardly from the central portion of the floor structure spaced below the auger opening in the inclined inner wall towards the outer wall support.

3. The hopper bottom according to claim 2 wherein the slide member is substantially parallel the inclined inner wall above the slide member.

4. The hopper bottom according to claim 2 wherein the slide member comprises a generally U-shaped trough portion extending upwardly and outwardly from an inner end to an outer end of the slide member.

5. The hopper bottom according to claim 1 wherein there is provided a pan member arranged to span the bottom end of the inclined inner wall so as to be slidably removable from the chute in the radial direction.

6. The hopper bottom according to claim 5 wherein there is provided an upright wall portion extending partway about the central area of the floor structure which spans between the bottom end of the inclined inner wall and the floor structure spaced below the bottom end of the inclined inner wall, the pan member including a central portion arranged to be supported on the floor structure and a side wall extending at an upward and outward inclination from the central portion to the bottom end of the inclined inner wall spaced above the floor structure by the upright wall portion.

7. The hopper bottom according to claim 5 wherein the pan member is integrally formed with a slide member arranged to be supported between the chute walls so as to be slidably removable from the chute in the radial direction together with the pan member, the slide member extending upwardly and outwardly from the central portion of the floor structure spaced below the auger opening in the inclined inner wall towards the outer wall support.

8. The hopper bottom according to claim 1 wherein the floor structure comprises a floor surface between the chute walls which spans substantially horizontally from the central portion towards the outer wall support.

9. The hopper bottom according to claim 1 wherein there is provided an access opening in the inclined inner wall in communication with the chute between the chute walls at a location spaced radially outwardly and upwardly from the auger opening.

10. The hopper bottom according to claim 9 wherein a top edge of the access opening is generally V-shape so as to extend upwardly and inwardly from opposing sides of the access opening towards a central apex.

11. The hopper bottom according to claim 9 wherein the inclined inner wall comprises a protruding portion between the auger opening and the access opening in which the inclined inner wall protrudes upwardly and inwardly from the chute walls towards a central apex between the chute walls such that a top edge of the auger opening is generally V-shape so as to extend upwardly and inwardly from opposing sides of the auger opening towards the central apex.

12. The hopper bottom according to claim 1 wherein the chute walls are parallel to one another.

13. The hopper bottom according to claim 1 wherein the chute walls extend only partway from the central portion towards the outer wall support to respective upright outer edges, the upright outer edges each comprising a flange extending along a length thereof which is oriented transversely to the chute wall.

14. The hopper bottom according to claim 1 further comprising:

a plurality of ventilation openings formed in the inclined inner wall;

a screen member spanning each of the ventilation openings in which the screen member is substantially flush with an upper surface of the inclined inner wall; and an inlet opening in the outer wall support arranged for communication with a blower;

the outer wall support comprising a continuous cylindrical wall being joined to the floor structure about a full circumference of the floor structure so as to define an enclosed manifold space surrounding the inclined inner wall such that ventilation air forced into the enclosed manifold space is arranged to be directed upwardly through the ventilation openings in the inclined inner wall.

15. The hopper bottom according to claim 14 wherein the ventilation openings are elongate in a longitudinal direction and wherein there is provided an upright support flange fixed below each of two opposed edges extending in the longitudinal direction of each ventilation opening.

16. The hopper bottom according to claim 1 wherein:

the outer wall support comprises a continuous cylindrical wall being joined to the floor structure about a full circumference of the floor structure; and the floor structure comprises:

a floor sheet spanning from the central area to a bottom side of the outer wall support;

a perimeter member mounted about the outer wall support at the bottom side thereof; and a plurality of radial supports, each spanning along an upper surface of the floor sheet from the central area to the outer wall support at the perimeter member;

each radial support comprising a horizontal portion joined to the upper surface of the floor sheet and an upright portion extending up from the horizontal wall portion along a full length of the radial support between the central area and the outer wall support.

17. The hopper bottom according to claim 16 wherein the floor sheet protrudes radially outward beyond the outer wall support beneath the perimeter member which is joined to the floor sheet about a circumference of the floor sheet.

18. The hopper bottom according to claim 1 wherein there is provided a perimeter flange about the access opening in the outer wall, the perimeter flange along each side of the access opening extending outwardly from the outer wall at an inclination which is sloped away from the opposing side of the opening.

19. A hopper bottom for supporting a cylindrical side wall of a grain bin thereon, the hopper bottom comprising:
   a floor structure including a floor sheet spanning radially outwardly from a central area to a surrounding perimeter area;
   an outer wall support extending upwardly from the perimeter area of the floor structure about the central area of the floor structure to a top end spaced upwardly from the floor structure and arranged to support the cylindrical side wall of the grain bin thereabove;
   an inclined inner wall having an inverted cone shape so as to taper downwardly and inwardly from a top end to a bottom end of the inclined inner wall, the top end of the inclined inner wall being joined with the outer wall support at a location spaced above the floor structure about a full circumference of the outer wall support, and the bottom end of the inclined inner wall supported on the floor structure about the central area of the floor structure;
   a plurality of ventilation openings formed in the inclined inner wall;
   a screen member spanning each of the ventilation openings in which the screen member is substantially flush with an upper surface of the inclined inner wall; and
   an inlet opening in the outer wall support arranged for communication with a blower;
   the outer wall support comprising a continuous cylindrical wall being joined to the floor structure about a full circumference of the floor structure such that the inclined inner wall, the cylindrical wall of the outer wall support and the floor sheet of the floor structure collectively define an enclosed manifold space surrounding the inclined inner wall;
   the inlet opening in the continuous cylindrical wall of the outer wall support and the ventilation openings in the inclined inner wall comprising the only openings in the enclosed manifold space such that ventilation air forced into the enclosed manifold space is arranged to be directed upwardly through the ventilation openings in the inclined inner wall.

20. A hopper bottom for supporting a cylindrical side wall of a grain bin thereon, the hopper bottom comprising:
   a floor structure spanning radially outwardly from a central area to a surrounding perimeter area;
   an outer wall support extending upwardly from the perimeter area of the floor structure about the central area of the floor structure to a top end spaced upwardly from the floor structure and arranged to support the cylindrical side wall of the grain bin thereabove; and
   an inclined inner wall having an inverted cone shape so as to taper downwardly and inwardly from a top end to a bottom end of the inclined inner wall, the top end of the inclined inner wall being joined with the outer wall support at a location spaced above the floor structure about a full circumference of the outer wall support, and the bottom end of the inclined inner wall being supported on the floor structure about the central area of the floor structure;
   the outer wall support comprising a continuous cylindrical wall being joined to the floor structure about a full circumference of the floor structure;
   the floor structure comprising:
      a floor sheet spanning from the central area to a bottom side of the outer wall support;
      a perimeter member mounted continuously circumferentially about the outer wall support at the bottom side thereof; and
      a plurality of radial supports, each spanning along an upper surface of the floor sheet from the central area to the outer wall support at the perimeter member;
      each radial support comprising a horizontal portion joined to the upper surface of the floor sheet and an upright portion extending up from the horizontal wall portion along a full length of the radial support between the central area and the outer wall support.

* * * * *